United States Patent
Coleman et al.

(10) Patent No.: US 6,811,279 B2
(45) Date of Patent: Nov. 2, 2004

(54) VARIABLE COLOR AND IMPRESSION CONFECTION

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 10/217,424

(22) Filed: Aug. 14, 2002

(65) Prior Publication Data

US 2004/0032731 A1 Feb. 19, 2004

(51) Int. Cl.$^7$ ................................................. A63H 33/00
(52) U.S. Cl. ..................... 362/101; 362/166; 362/293; 426/104; 426/132; 426/134; 446/242
(58) Field of Search ................................ 362/101, 109, 362/208, 186, 351, 277, 806, 808, 166, 182, 205, 800, 293, 253; 446/242, 71, 81, 456, 484, 491; 426/104, 132, 134

(56) References Cited

U.S. PATENT DOCUMENTS

| | | | |
|---|---|---|---|
| 2,155,563 A | 4/1939 | Schmidt ..................... 40/431 |
| 3,340,865 A | 9/1967 | Southwick ................... 600/27 |
| 4,858,083 A | 8/1989 | Wakimoto ................... 362/101 |
| 4,914,748 A | 4/1990 | Schlotter, IV et al. ....... 362/109 |
| 5,037,346 A | 8/1991 | Cimock ..................... 362/109 |
| 5,105,343 A | 4/1992 | Wkimoto .................... 446/419 |
| 5,310,377 A | 5/1994 | Joja ......................... 362/101 |
| 5,471,373 A | 11/1995 | Coleman et al. ............ 446/219 |
| 5,536,054 A | 7/1996 | Liaw ......................... 294/1.1 |
| 5,545,069 A * | 8/1996 | Glynn et al. .................. 446/73 |
| 5,690,414 A | 11/1997 | Jeng ......................... 362/120 |
| 5,733,033 A | 3/1998 | Coleman ................... 362/109 |
| 5,947,789 A | 9/1999 | Chan ........................ 446/219 |
| 6,000,820 A * | 12/1999 | Murray ...................... 362/441 |
| 6,050,697 A | 4/2000 | Bennington ................ 362/109 |
| 6,062,936 A * | 5/2000 | Rudell et al. ................. 446/71 |
| 6,135,606 A * | 10/2000 | Fernandez et al. .......... 362/109 |
| 6,186,637 B1 | 2/2001 | Murrietta ................... 362/101 |
| 6,187,352 B1 | 2/2001 | Crosbie ..................... 426/104 |
| 2003/0016529 A1 * | 1/2003 | Schuren et al. ............. 362/109 |

* cited by examiner

*Primary Examiner*—John Anthony Ward
*Assistant Examiner*—Hargobind S. Sawhney
(74) *Attorney, Agent, or Firm*—Clyde I. Coughenour

(57) ABSTRACT

A flashlight confection combination novelty provides various illusions and color variations to an observer by using multi-color filters, that can be moved relative to the confection, and by providing the confection and/or an insert within the confection with irregularities and contours that transfer light differently including shading, reflecting, refracting and diffusion, and by using additional lighting with projection of images.

16 Claims, 3 Drawing Sheets

VARIABLE COLOR AND IMPRESSION CONFECTION

BACKGROUND OF THE INVENTION

1. Field of the Invention

A novelty device combines a confection and a multi-color light filter on a light source to give different impressions and illusions to an observer.

2. Description of Related Art

Novelty devices combining a confection and illumination means are old. One example of this is U.S. Pat. No. 4,914,748, issued Apr. 3, 1990 to W. Schlotter et al. This patent discloses a confection that includes a light source that projects through the confection to illuminate it. Another confection light combination is disclosed in U.S. Pat. No. 5,471,373, issued Nov. 28, 1995 to T. Coleman et al. This patent discloses projecting a light upwardly and outwardly from the confection. Still another confection light combination is disclosed in U.S. Pat. No. 5,733,033, issued Mar. 31, 1998 to T. Coleman et al. This patent combines a confection, sound and light with the light flashing in concert with sound production.

The concept of having a multi-color disk that can be used to project different colors is old per se. U.S. Pat. No. 4,858,083, issued Aug. 15, 1989 to Y. Wakimoto, and U.S. Pat. No. 5,947,789, issued Sep. 7, 1999 to A. Chan, disclose a multi-color disk that can be moved by gravity and/or inertia due to a tilting device housing the loosely held disk. U.S. Pat. No. 3,340,865, issued Sep. 12, 1967 to T. Southwick and U.S. Pat. No. 5,037,346, issued Aug. 6, 1991 to B. Cimock, disclose a multi-color disk that can be moved by rotation of a tab provided on the disk. U.S. Pat. No. 5,536,054, issued Jul. 16, 1996 to C. Liaw, and U.S. Pat. No. 6,187,352, issued Feb. 13, 2001 to S. Crosbie, teach confections that are pivotal on a holder. U.S. Pat. No. 5,690,414, issued Nov. 25, 1997 to J. Jeng, provides for internal and external lighting along a screwdriver for illumination and signaling, and U.S. Pat. No. 6,135,606, issued Oct. 24, 2000 to R. Fernandez et al, disclose a translucent confection illuminated internally by multi-color blinking lights from a confection holder. The confection can take a variety of colors and shapes. U.S. Pat. No. 5,310,377, issued May 10, 1994 to T. Joja, and U.S. Pat. No. 6,050,697 disclose the projection of images.

This invention relates to an improvement over the flashlight candy combination described in U.S. Pat. No. 4,914,748, issued Apr. 3, 1990. In that patent a multi-color candy has light directed to the different colored linear sections through apertures in a connector. It has been found that multi-color effects can be obtained by placing a multi-color transparent and/or translucent disk between the light bulb and candy. The disk can be stationary or movable and the candy and an internal light conducting element within the candy can be shaped to deflect, reflect or refract light.

SUMMARY OF THE INVENTION

The novelty device of this invention combines a confection with a multi-color light filter placed between the confection and the light source. By relative movement between the observer, confection and/or the multi-color light filter, different light patterns, colors and impressions are achieved by one observing the confection. The change in color and/or color patterns can be brought about by gravity, manual or mechanical movement of the confection or color filters. The color filters can contain opaque areas that define an image and the confection can be contoured to obstruct and reflect and diffuse light to yield variable patterns.

DESCRIPTION OF THE PREFERRED EMBODIMENTS

Figure 1:
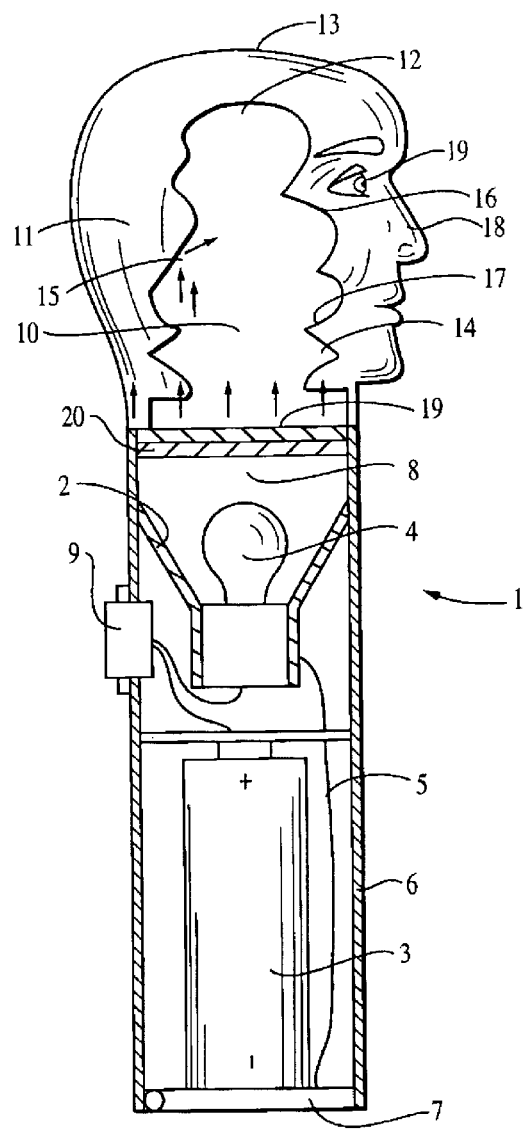
FIG. 1 shows a novelty device of the invention including a flashlight multi-color filter and confection.

The basic components of the novelty device are a confection, a color filter means, and a light source. As seen in FIG. 1, the novelty device 1 includes a flashlight-mounted novelty. The flashlight includes a housing 6 having a closed end 7 and an open end 8. An electrical energy source 3, consisting of one or more batteries, provides electricity for the light bulb 4 through conductors 5 with the electric current controlled with a switch 9. Light from the light bulb either passes upwardly, or is reflected upwardly, from a reflector 2, that surrounds the light bulb, through the housing open end 8 and the multi-color light filter 20 and into the base 19 of a plastic FIG. 10 and/or confection 11.

Figure 10:
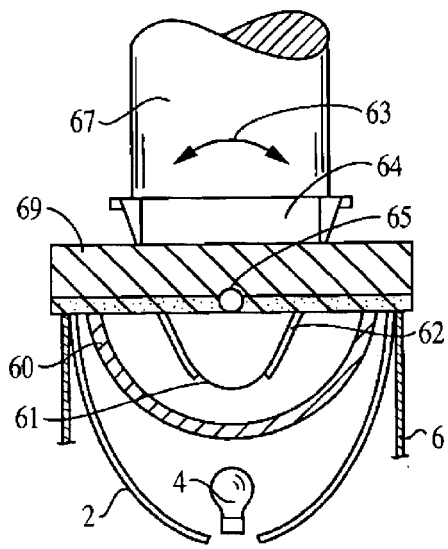
FIG. 10 is a fragmentary, sectional end view of a pivotable confection and modified multi-color filter.

In FIG. 1, a stationary multi-cooler disk 20 is placed between the light bulb 4 and the candy or confection 11 having a plastic FIG. 10 fixed on the housing and placed within the candy. The candy and/or plastic figure can take the shape of an animate or inanimate object with the irregularities on either or both designed to pass and/or reflect and/or refract light into select configurations or designs. The remote ends 12, 13 of the plastic confection figure can be shaped to focus or control the beam of light during use and the remaining device can function as a flashlight after the candy is consumed. The multi-color light filter 20 can have an opaque area or distinct colored areas in the shape of an animate or inanimate image or object such that light passing through the filter conveys the image through the plastic FIG. 10 and/or confection 11 and beyond. Using this arrangement the image can be projected onto a distant object or conveyed to an observer remote from the flashlight. This arrangement permits the flashlight and plastic figure to be used as an amusement device or toy or for illumination after the confection is consumed.

The plastic FIG. 10 is shown transparent with irregularities. The irregularities are designed to convey special effects common to optics. The upper extreme 12 is formed convex to converge light rays. One area 14 is designed to refract light passing through it. This can yield a variety of color and a halo effect. A second area 15 is designed to reflect light striking it back across the plastic figure to assist illumination of the adjacent confection features. A third area 16 is designed to pass light through into the confection. A fourth area 17 and reflection area 15 act to block light and thus provide a somewhat shaded area.

The shaped confection 11 is in the shape of a human head. Without the use of a plastic figure, the features can be constructed to yield specific highlighting and optical features. Recessing and raising the features and diminishing and exaggerating feature sizes can be used to shade and emphasize features. The color schemes of the multi-color disk can be used in concert with these feature irregularities to enhance various visual affects. Normally the nose 18, being remote from internally transmitted rays, forms a shaded or less illuminated area, the eyes 19 when directly in line with the light source brightly reflect light, etc.

Figure 2:
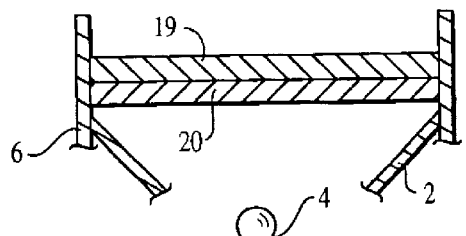
FIG. 2 is a fragmentary, sectional end view of the multi-color filter area of FIG. 1.
Figure 3:
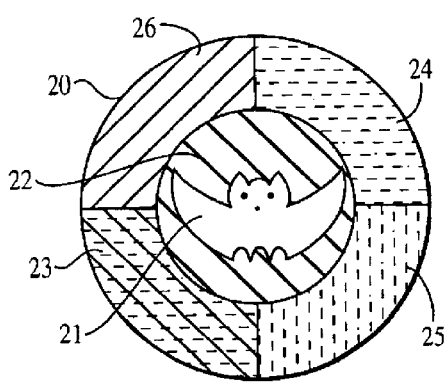
FIG. 3 is a top view of the multi-color filter of FIGS. 1 and 2.

FIGS. 2 and 3 represent a side view of the multi-color filter and its position within the housing and top view of the multi-color filter respectively. The multi-color filter 20 is shown with an opaque area 21, that can be projected through the plastic figures and confection, as well as transparent and/or translucent multi-color areas 22, 23, 24, 25, 26. Because of the various colors projected into the plastic FIG. 10 and confection 11 through the multi-color filter 20 and because of the light manipulation by the irregular configuration of the plastic FIG. 10 and confection 11, any relative movement between the observer and novelty device 1 will result in varying the impressions seen by the observer. This will be significant in view of the motions inherent in using the device as a light source and in consumption of the confection.

Figure 4:
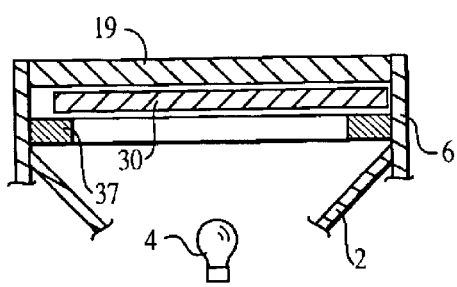
FIG. 4 is a fragmentary, sectional end view of a floating multi-color filter.
Figure 5:
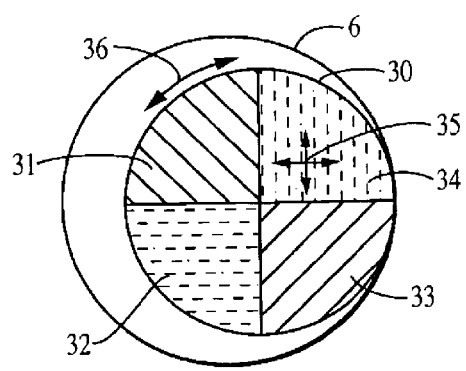
FIG. 5 is a top view of the floating multi-color filter of FIG. 4 within the novelty housing.

FIGS. 4 and 5 are similar to those shown in FIGS. 2 and 3 except that the multi-color filter 30 is free to float between the reflector 2 and base support 19. A transparent support 37 extends partially or completely over the reflector to house and frictionally support the multi-color filter 30. The frictional forces retaining the multi-color filter in place are so weak that tilting the device or shaking it readily permits the multi-color filter 30 to translate 35 and/or to rotate 36 due to gravity and momentum. The movement of the multi-color filter 30 exposes the plastic FIG. 10 and confection 11 to different colors 31, 32, 33, 34 in different areas and changes the angle of incident of the different colors. The result is an enhanced varying of the impressions of the objects being observed due to the changing color schemes.

Figure 6:
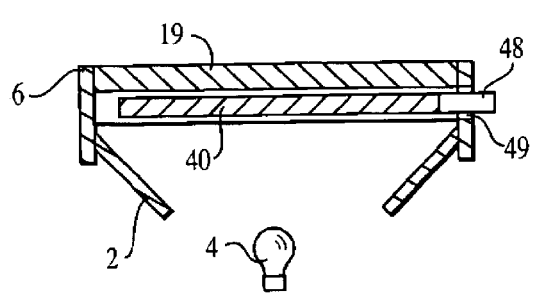
FIG. 6 is a fragmentary, sectional end view of a manually movable multi-color filter.
Figure 7:
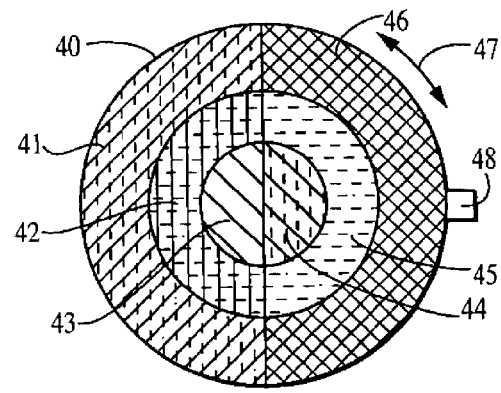
FIG. 7 is a top view of the manually movable multi-color filter of FIG. 6.

FIGS. 6 and 7 are similar to those shown in FIGS. 1 and 2 except that the multi-color filter 40 is provided with a tab 48 that projects through a slot 49 in the housing 6 to permit manual manipulation of the frictionally secured multi-color filter located between the reflection means 2 plastic FIG. 10 and confection 11. By rotating and/or reciprocating 47 the color filter, the various colors 41, 42, 43, 44, 45, 46 shift under the plastic figure and confection to expose the various areas to different colors and thus change the color scheme and impressions seen by an observer.

Figure 8:
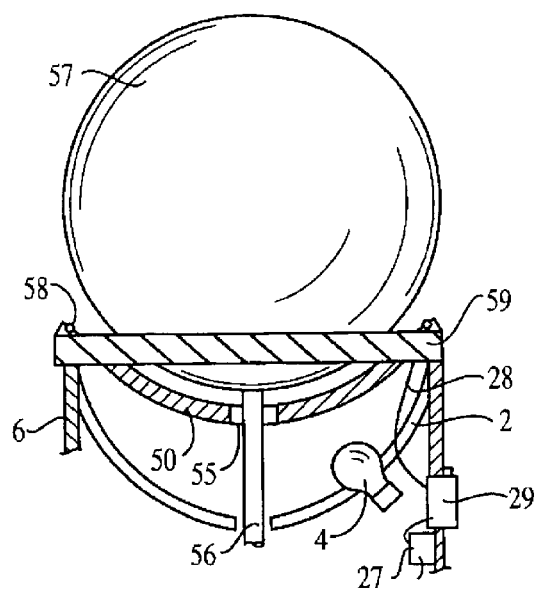
FIG. 8 is a fragmentary, sectional end view of a modified confection and multi-color filter with additional lighting.
Figure 9:
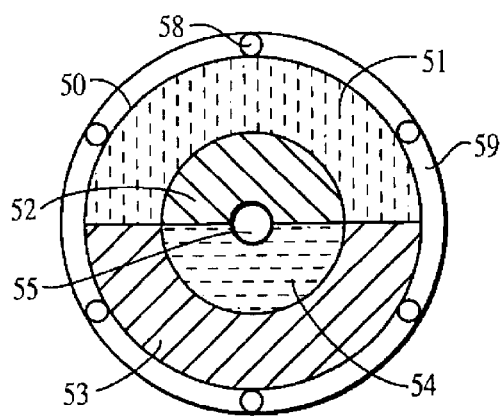
FIG. 9 is a top view of the multi-color filter and LED bulbs with their support of FIG. 8.

FIGS. 8 and 9 represent a modification of the structure shown in FIGS. 1-3 in that a common spherical shape, such as a lollipop, on a stick is provided for. The confection 57 can have its holding stick 56 placed through an opening 55 in the multi-color filter 50. In addition, a second light source is provided for in the form of multi-color LED bulbs 58 that extend around and above the multi-color filter and project additional light into the confection 57. A separate switch 29 and wiring circuit 28 can be used, with a control 27 for varying the sequence and combination of illuminating the lights alone or in concert with lights shining through the multi-color filter 50. The light entering the confection 57 can be entirely from the LED's 58 or from the light from the bulb 4 passing through the multi-color filter colors 51, 52, 53, 54 or from both that can be used alternately or together in random sequences for a large number of color schemes. The colors can be blended together for various additional effects seen by an observer, including forming new colors by addition or subtraction of colors.

Figure 11:
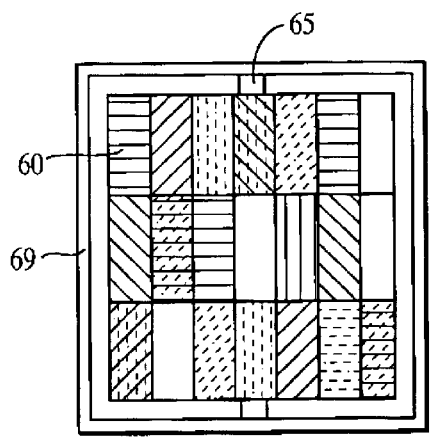
FIG. 11 is a top view of the multi-color filter and confection support of FIG. 10.

FIGS. 10 and 11 modify the structure shown in FIGS. 1-3 somewhat in that the multi-color filter 60 is formed arcuate to accommodate the lower end of a confection that can be pivoted about its base on a bearing means 65. An elongated confection 67 is directly pivoted 63 on the bearing means 65 or a support holder 64 to expose the confection to multi-colors produced as the light from the bulbs 4 passes through the multi-color filter 60. To separate the colors entering into the confection, the lower extreme 61 of the confection or transparent support holder 64 is rounded off for use as a color pick up. Adjacent areas are covered by an opaque covering 62 to prevent adjacent colors from combining with those closest to the multi-color filter pick up area 61. The opaque covering prevents colors that are not adjacent to the lower extreme 61 from traveling simultaneously up the confection 67.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What is claimed is:

1. A novelty illuminated confection combination comprising:
    a housing having an upper end and a lower end;
    an electrical current source within said housing;
    an illumination means within said housing adjacent to said upper end for providing light;
    a switching means and electrical circuit for controlling current to said illumination means;
    a light conducting confection having upper, lower and side surfaces attached to said housing upper end whereby light from said illumination means is conducted into said light conducting confection;
    a multi-color light filter held between said illumination means and said light conducting confection for changing the color of said light conducting confection; and,
    means for varying the appearance of said light conducting confection;
    said means for varying the appearance of said light conducting confection includes a light transmitting object having upper, lower and side surfaces within said light conducting confection;
    said light transmitting object has an irregular configuration so as to vary the intensity and direction of transmitted light;
    said light transmitting object has different light conducting properties than those of said light conducting confection.

2. A novelty illuminated confection combination as in claim 1 wherein:

said means for varying the appearance of said light conducting confection includes an irregular shape configuration of said light conducting confection to vary the intensity and direction of transmitted light.

3. A novelty illuminated confection combination as in claim 2 wherein:

said light conducting confection irregular shape configuration includes areas that block light, areas that reflect light, and areas that refract the light passing through said multi-color filter.

4. A novelty illuminated confection combination as in claim 1 wherein:

said light conducting confection upper surface is convex to focus light passing through said light conducting confection upper surface.

5. A novelty illuminated confection combination as in claim 4 wherein:

said light conducting confection irregular shape configuration includes areas that block light, areas that reflect light, and areas that refract light passing through said multi-color filter.

6. A novelty illuminated confection combination as in claim 1 wherein:

a multi-color light filter holding means secures said multi-color light filter frictionally so as to permit gravity and inertia to shift said multi-filter light filter as said housing is tilted or moved.

7. A novelty illuminated confection combination as in claim 6 wherein:

said multi-color light filter holding means includes a transparent support between said illumination means and said multi-color light filter;

said multi-color light filter holding means has a diameter greater than that of said multi-color light filter so that said multi-color light filter is free to both rotate and reciprocate.

8. A novelty illuminated confection combination as in claim 1 wherein:

said multi-color light filter has a tab extending through an opening in said light filter holding means so that said light filter can be manipulated.

9. A novelty illuminated confection combination as in claim 8 wherein:

said multi-color light filter holding means frictionally holds said multi-color light filter so that said multi-color light filter can be reciprocated and rotated.

10. A novelty illuminated confection combination comprising:

a housing having an upper end and a lower end;

an electrical current source within said housing;

an illumination means within said housing adjacent to said upper end for providing light;

a switching means and electrical circuit for controlling current to said illumination means;

a light conducting confection having upper, lower and side surfaces attached to said housing upper end whereby light from said illumination means is conducted into said light conducting confection;

a multi-color light filter held between said illumination means and said light conducting confection for changing the color of said light conducting confection; and, means for varying the appearance of said light conducting confection;

said light conducting confection lower surface has a hemispherical configuration; and, said housing upper end has a circular configuration for reception of said confection lower surface.

11. A novelty illuminated confection combination as in claim 10 wherein:

said means for varying the appearance of said light conducting confection includes said multi-color light filter being hemispherically configured.

12. A novelty illuminated confection combination as in claim 11 wherein:

said confection lower surface is provided with a stick for holding it;

said hemispherically configured multi-color light filter has an opening for passage of said stick.

13. A novelty illuminated confection combination as in claim 10 wherein:

said housing upper end supports a plurality of LED bulbs that project light into said hemispherical configuration light conducting confection lower surface.

14. A novelty illuminated confection combination as in claim 13 wherein:

said means for varying the appearance of said light conducting confection includes said multi-color light filter being hemispherically configured;

said confection lower surface is provided with a stick for holding it;

said hemispherically configured multi-color light filter has an opening for passage of said stick.

15. A novelty illuminated confection combination comprising:

a housing having an upper end and a lower end;

an electrical current source within said housing;

an illumination means within said housing adjacent to said upper end for providing light;

a switching means and electrical circuit for controlling current to said illumination means;

a light conducting confection having upper, lower and side surfaces attached to said housing upper end whereby light from said illumination means is conducted into said light conducting confection;

a multi-color light filter held between said illumination means and said light conducting confection for changing the color of said light conducting confection; and, means for varying the appearance of said light conducting confection;

said means for varying the appearance of said light conducting confection includes said multi-color light filter being arcuately configured;

said light conducting confection lower end is pivotally secured to said housing upper end so as to be capable of traversing adjacent to said arcuately configured multi-color light filter to aline said light conducting confection lower end with different color areas of said multi-color light filter.

16. A novelty illuminated confection combination as in claim 15 wherein:

the light from said multi-color light filter is transferred to said confection by an arcuately shaped light pick up;

opaque shielding adjacent to said arcuately shaped light pick up to block light passing through said multi-color light filter that does not pass through said multi-color light filter directly adjacent to said arcuately shaped light pickup.

* * * * *